United States Patent
Onuma

(10) Patent No.: US 12,051,148 B2
(45) Date of Patent: Jul. 30, 2024

(54) IMAGE PROCESSING APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventor: Kazufumi Onuma, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 142 days.

(21) Appl. No.: 17/742,464

(22) Filed: May 12, 2022

(65) Prior Publication Data

US 2022/0383586 A1    Dec. 1, 2022

(30) Foreign Application Priority Data

May 28, 2021  (JP) .................................. 2021-090584

(51) Int. Cl.
*G06T 15/20* (2011.01)
*G06F 3/01* (2006.01)

(52) U.S. Cl.
CPC .............. *G06T 15/20* (2013.01); *G06F 3/011* (2013.01); *G06F 3/012* (2013.01); *G06F 3/013* (2013.01); *G06F 3/017* (2013.01)

(58) Field of Classification Search
CPC .......... G06F 3/011; G06F 3/012; G06F 3/013; G06F 3/017; G06T 15/20; G06T 15/205; G06T 15/40; G06T 15/50; G06T 17/00; G06T 17/20; G06T 7/194; H04N 7/18; H04N 13/178; H04N 13/282
See application file for complete search history.

(56) References Cited

U.S. PATENT DOCUMENTS

| | | | |
|---|---|---|---|
| 10,659,822 B2 | 5/2020 | Onuma | |
| 11,202,104 B2 | 12/2021 | Onuma | |
| 11,250,619 B2 * | 2/2022 | Sakakima | G06T 17/00 |
| 11,354,849 B2 * | 6/2022 | Arai | G06T 19/00 |
| 11,409,424 B2 * | 8/2022 | Ishikawa | G06T 15/20 |
| 11,468,258 B2 * | 10/2022 | Ishikawa | G06V 20/20 |
| 11,627,251 B2 * | 4/2023 | Ogasawara | H04N 23/62 |
| | | | 348/38 |

(Continued)

FOREIGN PATENT DOCUMENTS

JP     2019-050593 A     3/2019

*Primary Examiner* — Vijay Shankar
(74) *Attorney, Agent, or Firm* — Carter, DeLuca & Farrell LLP

(57) ABSTRACT

The present disclosure allows for generating a virtual viewpoint image matching an object's sight. To achieve this, an image processing apparatus comprises one or more memories storing instructions; and one or more processors executing the instructions to: obtain a plurality of images captured by a plurality of image capturing devices while a symbol representing a position at which an object should direct a look is being displayed; and generate a virtual viewpoint image in accordance with a position of a virtual viewpoint and a view direction from the virtual viewpoint, the position of the virtual viewpoint being a position at which the symbol is displayed, and the view direction from the virtual viewpoint being a direction specified based on the position of the virtual viewpoint and a position of the object.

10 Claims, 8 Drawing Sheets

(56) References Cited

U.S. PATENT DOCUMENTS

| | | | |
|---|---|---|---|
| 2019/0066382 A1* | 2/2019 | Kubo | ............... G06T 19/006 |
| 2019/0279418 A1* | 9/2019 | Sakakima | ............ G06T 15/20 |
| 2021/0134058 A1 | 5/2021 | Ito et al. | |

* cited by examiner

IMAGE PROCESSING APPARATUS, METHOD FOR CONTROLLING THE SAME, AND NON-TRANSITORY COMPUTER-READABLE STORAGE MEDIUM

BACKGROUND

Field

The present disclosure relates to an image processing apparatus, a method for controlling the same, and a non-transitory computer-readable storage medium.

Description of the Related Art

A known virtual viewpoint image generation system can generate, from pictures captured by a plurality of cameras, a picture seen from a virtual viewpoint specified by a user and reproduce the pictures as a virtual viewpoint image. For example, the document: Japanese Patent Laid-Open No. 2019-050593. The system disclosed in the document transmits pictures captured by a plurality of cameras and then extract, by using a picture computing server (picture processing apparatus), a picture having significant variation as a foreground picture and a picture having little variation as a background picture of the captured pictures. The system then estimates, generates, in accordance with the extracted foreground picture, and stores a shape of a three-dimensional model of an object in a storage device together with the foreground picture and the background picture. The foreground picture and the background picture are referred to as materials for generating a virtual viewpoint image. The system then obtains appropriate data from the storage device in accordance with the virtual viewpoint specified by the user and generates the virtual viewpoint image.

As content in which a virtual viewpoint image is used, delivery of a captured object, such as a singer, to end users in real time is conceivable.

In capturing and delivering an image of the object as described above, performance of a "looking at a camera", which is directing the object's sight toward the camera, is commonly performed. Unfortunately, the virtual viewpoint image makes the position of the virtual viewpoint unknown to the object (performer), making it difficult to direct a look at the position.

On the other hand, a method such as using a display device that indicates the position of the virtual viewpoint within a shooting region is also conceivable. Unfortunately, generating the virtual viewpoint image needs to generate a three-dimensional model from shooting data and subsequently generate an image in accordance with information of the virtual viewpoint, resulting in a delay of about a few seconds from shooting to generation of the virtual viewpoint image. Therefore, even displaying a virtual viewpoint on which an image is actually generated results in directing a look at a virtual viewpoint that is shifted by a few seconds, making it difficult to direct a look.

In addition, although it is conceivable that a method such as detecting a sight by using an image recognition technique and moving a virtual viewpoint in the direction of the sight, the virtual viewpoint may respond to a minute movement of the object's sight, or it is difficult to handle a movement of the sight, such as a turn-around motion.

SUMMARY

The present disclosure provides a technique that solves the aforementioned problems.

According to an aspect of the disclosure, there is provided an image processing apparatus, comprising: one or more memories storing instructions, and one or more processors executing the instructions to: obtain a plurality of images captured by a plurality of image capturing devices while a symbol representing a position at which an object should direct a look is being displayed; and generate a virtual viewpoint image in accordance with a position of a virtual viewpoint and a view direction from the virtual viewpoint, the position of the virtual viewpoint being a position at which the symbol is displayed, and the view direction from the virtual viewpoint being a direction specified based on the position of the virtual viewpoint and a position of the object.

The present disclosure allows for generating a virtual viewpoint image matching the object's sight.

Further features of the present disclosure will become apparent from the following description of exemplary embodiments with reference to the attached drawings.

DESCRIPTION OF THE EMBODIMENTS

Figure 1:
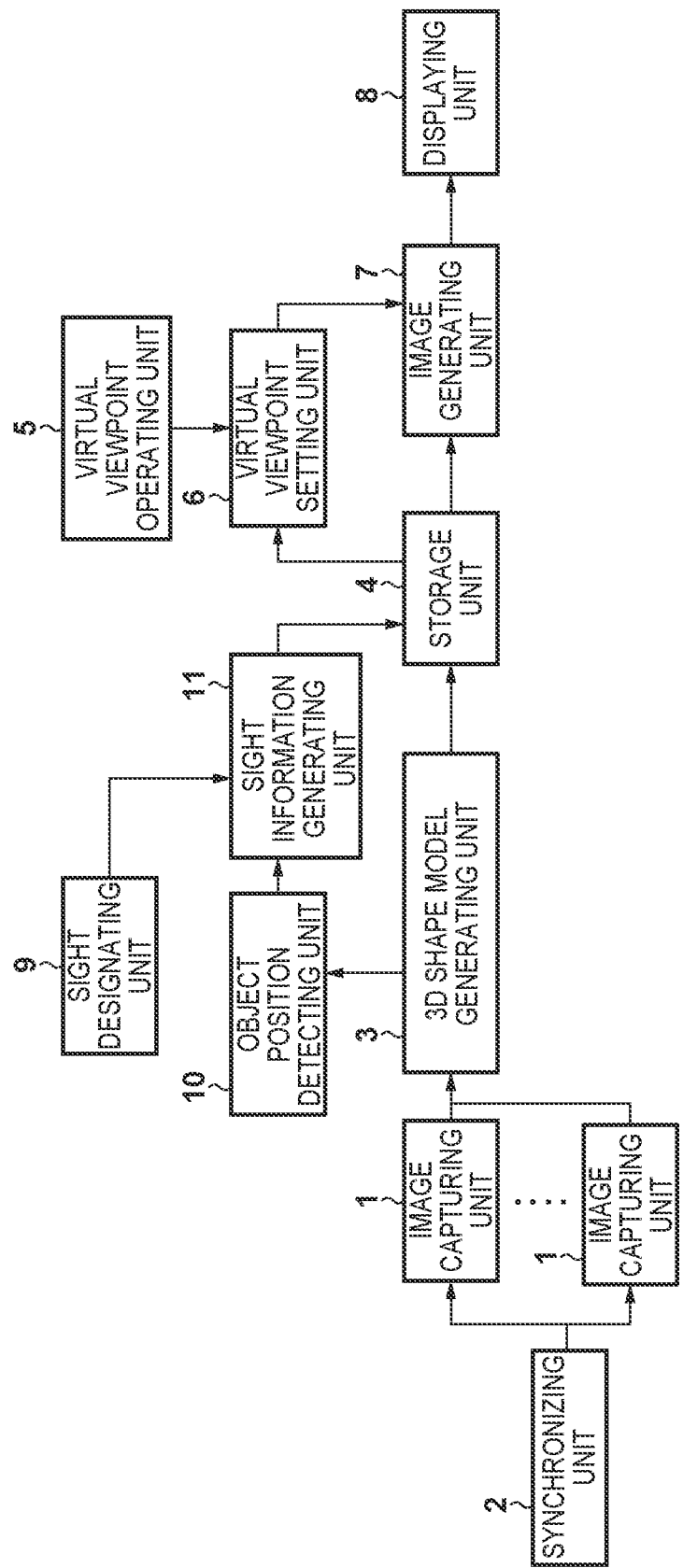
FIG. 1 illustrates a system configuration according to a first embodiment.

Hereinafter, embodiments will be described in detail with reference to the attached drawings. Note, the following embodiments are not intended to limit the scope of the present disclosure. Multiple features are described in the embodiments, but limitation is not made the present disclosure that requires all such features, and multiple such features may be combined as appropriate. Furthermore, in the attached drawings, the same reference numerals are given to the same or similar configurations, and redundant description thereof is omitted.

First Embodiment

<Basic System Configuration and Operation>

FIG. 1 illustrates a configuration of an image processing system that generates a virtual viewpoint image according to the present embodiment. The system includes a plurality of image capturing units 1, a synchronizing unit 2, a 3D (three-dimensional) shape model generating unit 3, a storage unit 4, a virtual viewpoint operating unit 5, a virtual viewpoint setting unit 6, an image generating unit 7, a displaying unit 8, a sight designating unit 9, an object position detecting unit 10, and a sight information generating unit 11. The system may include a single electronic device or may include a plurality of electronic devices.

Next, an overview of an operation of each component of the system will be described, and then, details of characteristic components according to the present embodiment will be described. First, a plurality of the image capturing units 1 perform image capturing in high-precision synchronization with each other in accordance with a synchronization signal from the synchronizing unit 2. When the synchronizing unit 2 outputs a synchronization signal at, for example, a 1/30 second interval the image capturing units 1 each perform image capturing in synchronization with each other at a 1/30 second interval. The image capturing units 1 each output a captured image obtained by shooting to the 3D shape model generating unit 3. The plurality of image capturing units 1 is disposed surrounding the object for capturing the object from a plurality of viewpoint positions and a plurality of directions.

The 3D shape model generating unit 3 extracts, for example, a plurality of silhouettes of the object by using the captured pictures at a plurality of viewpoints input and subsequently generates a three-dimensional model of the object by using the volume intersection method or the like. The 3D shape model generating unit 3 then outputs the generated three-dimensional model of the object and the captured pictures of the object to the storage unit 4. The object at this time includes a person and an item handled by the person to be an object of the 3D-shape model generation, but in the present embodiment, it is assumed for simplicity that the object includes only a person.

The storage unit 4 stores and accumulates the following data group as virtual viewpoint image materials. Specifically, the data group includes captured pictures of an object and a three-dimensional model of the object input from the 3D shape model generating unit 3. The data group also includes camera parameters such as a position and orientation as well as optical characteristics of each image capturing unit. Although a background model and a background texture picture may be preliminarily stored for rendering a background, the background is not focused on in the present embodiment nor mentioned herein.

The virtual viewpoint operating unit 5 includes a physical user interface such as a joystick, an operating unit of numerical data and supplies input information thereof to the virtual viewpoint setting unit 6.

The virtual viewpoint setting unit 6 sets virtual viewpoint position information in accordance with the information input from the virtual viewpoint operating unit 5 and supplies the virtual viewpoint position information to the image generating unit 7. The virtual viewpoint position information includes information corresponding to external parameters of a camera, such as position and orientation of a virtual viewpoint, information corresponding to internal parameters of the camera, such as focal length and angle of view, and information relating to time.

The image generating unit 7 obtains data at the corresponding time from the storage unit 4 in accordance with the information relating to the virtual viewpoint position and the time input. The image generating unit 7 renders the object at the virtual viewpoint from the three-dimensional model of the object and the captured pictures of the object included in the obtained data, generates, and outputs a virtual viewpoint image to the displaying unit 8. At this time, a background at the virtual viewpoint together with the object may be rendered from the background model and the background texture pictures.

Operation of Characteristic Components of Present Embodiment

Next, characteristic components and specific operations thereof according to embodiments will be described. The description will be divided into a description from generation to accumulation of sight information and a description of image generation using the sight information.

First, functions of the sight designating unit 9, the object position detecting unit 10, and the sight information generating unit 11, which are characteristic components of the present embodiment relating to sight information generation, will be described.

The sight designating unit 9 according to the present embodiment includes a display device such as a display or a projector, and a display control device that manages and controls the images to be displayed on the display device on a time-series basis. In the following, the sight designating unit 9 refers to a display portion unless otherwise specified. The sight designating unit 9, which is a display device disposed within or around a shooting region, displays a symbol representing a position of sight designation which is visible from the object. The symbol to be displayed may be, for example, a mark such as a circle or a cross.

The object position detecting unit 10 detects the position of the object within the shooting region. In the present embodiment, the position of the object is detected by using a three-dimensional model of the object, which is the result of shape estimation from the 3D shape model generating unit 3. Specifically, the position of the object, particularly the head position is detected by detecting an approximately 25 cm upper part of the three-dimensional model of the object as a head and calculating the centroid thereof.

The sight designating unit 9 designates the direction and the position at which the object directs a look. The display position of the sight designation on the sight designating unit 9 and the object position detected by the object position detecting unit 10 are preliminarily subjected to high-precision position calibration with the 3D shape model generating unit 3 and the image capturing unit 1, and both pieces of position information designated by respective pieces of information are regarded as information that can be treated in the same coordinate space.

Figure 2:
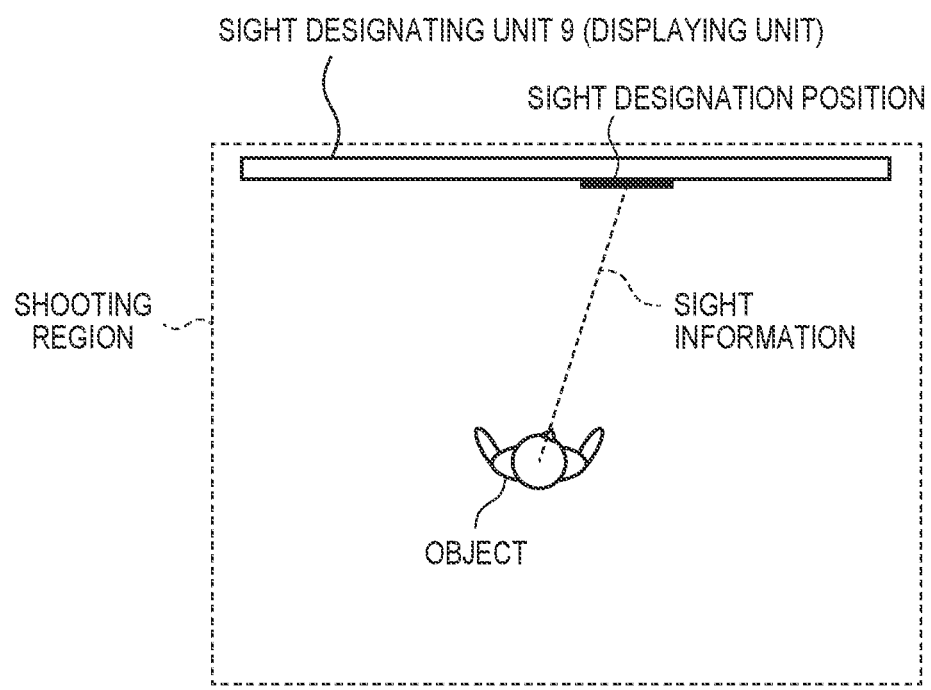
FIG. 2 illustrates a relation between an object, sight designation, and sight information according to the first embodiment.

The sight information generating unit 11 stores sight information in the storage unit 4 in accordance with the information of the sight designation position designated by the sight designating unit 9 and the position information of the object detected by the object position detecting unit 10. The sight information at this time is stored as information of a straight line (line segment) connecting the position of the object with the sight designation position as illustrated in FIG. 2.

Figure 3:
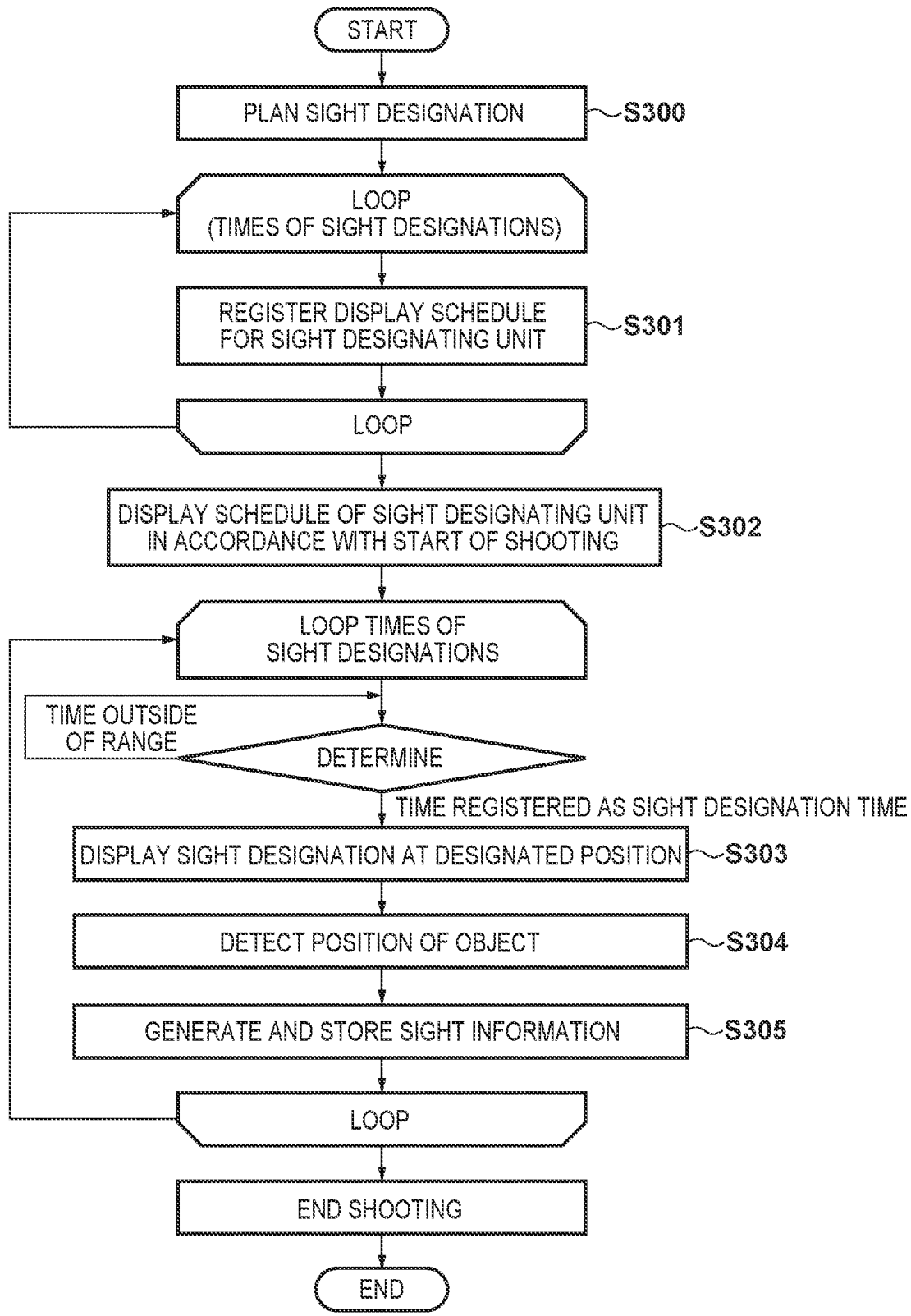
FIG. 3 illustrates a processing flow of sight information generation.

Next, the sight information generation processing of the sight information generating unit 11 will be described with reference to the flowchart of FIG. 3.

At S300, the sight information generating unit 11 plans, in accordance with the content and music to be captured, time of displaying the time sight designation from reference time as well as a position and a direction of displaying the sight designation.

Next, at S301, the sight information generating unit 11 registers as many times of sight designations as planned by the sight designating unit 9 with respect to planned sight designation.

Next, at S302, the sight information generating unit 11 starts operation of the sight designating unit 9 in accordance with the reference time of starting shooting. The reference time is, for example, starting operation of the sight designating unit 9 in synchronization with the time of starting a piece of music in a music video or a concert image.

Subsequently, at S303, the sight information generating unit 11 displays a mark at a position preliminarily registered in the displaying unit of the sight designating unit 9. The mark displayed at this time can also perform movement or the like in accordance with the registration information. At S304, the sight information generating unit 11 also causes the object position detecting unit 10 to detect the position of the object. At S305, the sight information generating unit 11 then generates sight information based on the sight designation position and the object position, and subsequently stores the same in the storage unit 4. Repetitively performing the aforementioned operations of S303 to S305 for a scheduled time period and a number of times allows for generating and storing sight information along with storing the virtual viewpoint image materials.

Figure 4:
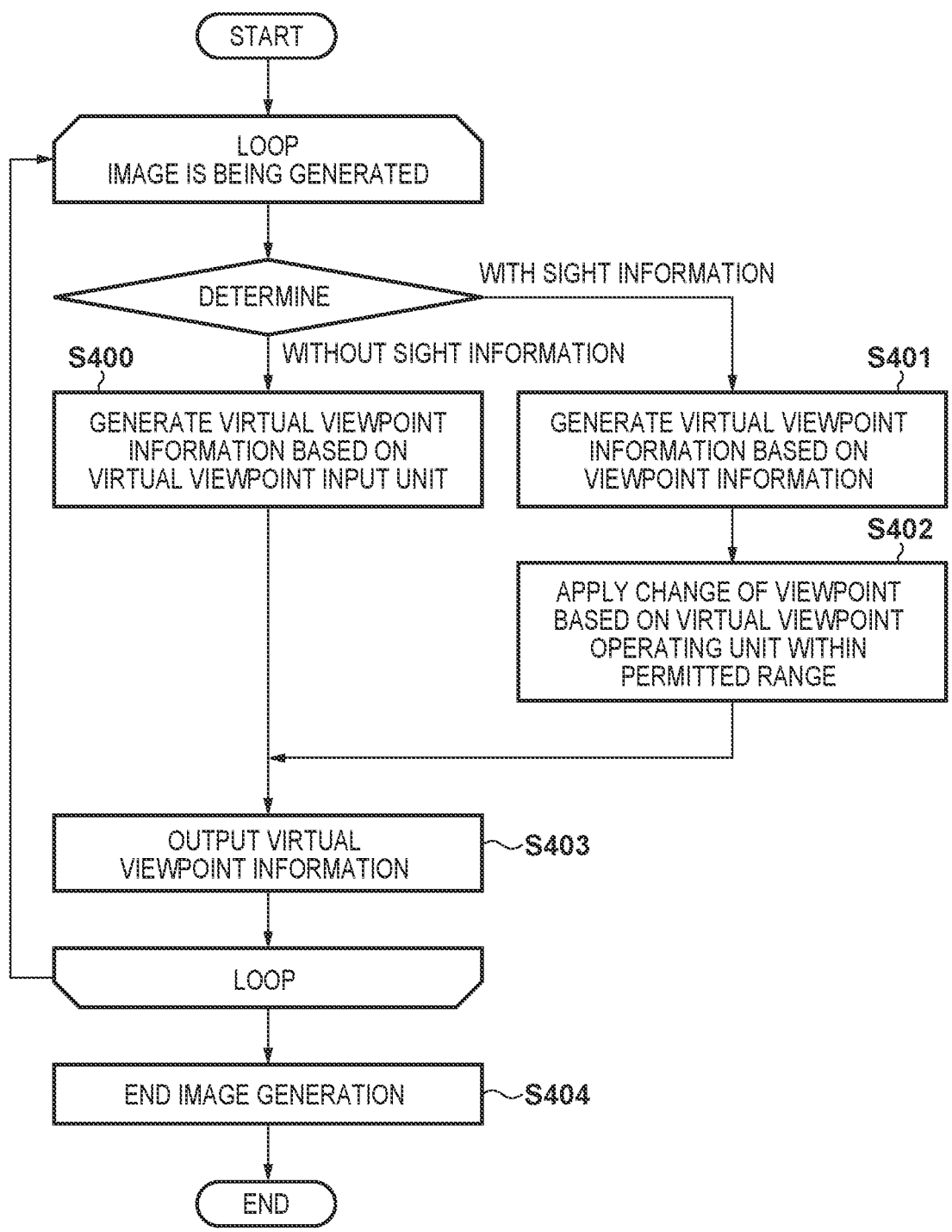
FIG. 4 illustrates a processing flow of image generation using the sight information.

Next, referring to the flowchart of FIG. 4, the processing flow with respect to the image generating operation by the virtual viewpoint setting unit 6 and the image generating unit 7 using the sight information will be described.

First, the virtual viewpoint setting unit 6 determines whether or not the sight information at a certain time (at the start of image storing at the initial stage) has been accumulated in the storage unit 4. Upon determining that sight information does not exist, the virtual viewpoint setting unit 6 performs processing at S400. At S400, the virtual viewpoint setting unit 6 generates virtual viewpoint information based on the input to the virtual viewpoint operating unit 5, at least during the aforementioned time (period). The virtual viewpoint information includes the position of the virtual viewpoint, as well as the optical axis direction and the angle of view at the virtual viewpoint.

On the other hand, the virtual viewpoint setting unit 6 advances the process to S401 upon determining that the sight information has been accumulated in the storage unit 4 at a certain time (at the start of image storing at the initial stage). At S401, the virtual viewpoint setting unit 6 generates virtual viewpoint information in accordance with the sight information accumulated in the storage unit 4. In the case of an embodiment, the virtual viewpoint information includes information defining, as the position of the virtual viewpoint, the mark position displayed in order to define the direction at which the object directs a look, information defining, as the optical axis, the view direction from the position of the virtual viewpoint toward (the head of) the object; and information indicating a predetermined angle of view. Subsequently, given the foregoing, the virtual viewpoint setting unit 6 performs at S402 a correction process of the virtual viewpoint information generated at S401. Specifically, the virtual viewpoint setting unit 6 generates virtual viewpoint information on which a change has been applied within a range permitting change of the angle of view or linear to-and-fro movement by the input to the virtual viewpoint operating unit 5. This allows for performance of bringing the virtual viewpoint position closer to the object or changing the angle of view, such as zooming, while keeping the "looking-at-camera" state.

Subsequently, at S403, the virtual viewpoint setting unit 6 sets the generated virtual viewpoint information to the image generating unit 7. The processing from S400 to S403 described above is performed at each time during image generation.

Each time a piece of virtual viewpoint information is set by the virtual viewpoint setting unit 6, the image generating unit 7 generates, and displays on the displaying unit 8, a virtual viewpoint picture (one frame in the virtual viewpoint image) based on the virtual viewpoint information which has been set, using pictures stored in the storage unit 4, which have been captured at a plurality of viewpoints at a corresponding time. Although in the foregoing the image generating unit 7 has been described suggesting that it outputs the generated virtual viewpoint picture to the displaying unit 8, the generated virtual viewpoint picture may be stored in the storage device as one frame of a file of the virtual viewpoint image or may be delivered over a network.

As has been described above, it becomes possible to generate, within a time range in which pictures are stored in the storage unit 4 as virtual information, a virtual viewpoint image facing toward the object from a position that turns out to be the virtual viewpoint position provided in a direction at which the object is directing a look, in other words, an image of the object looking at the camera.

The combination of the two processing flows allows for appropriately designating the sight to the object being in the shooting space of the virtual viewpoint image, whereby the sight information generated from the positional relation between the designated position and the object is storied for the time at which the designation is performed. In addition, using the sight information allows for generating a virtual viewpoint image from a direction at which the object should be directing a look when an image is being generated, even when there is a delay in virtual viewpoint image generation.

Other Present Embodiment

In the present embodiment, the sight designating unit 9 may be configured to include a physical mark without being limited to the configuration using a display device such as a display. For example, the mark may be configured as a rod-shaped body having a sphere attached at one end thereof, designating the object to direct a look at the sphere. A configuration including a motion tracking unit that can detect the spherical body allows for three dimensionally obtaining the sight designation position. Additionally, in the aforementioned case, the device, having a tracking unit, turns out to store the position of the physical marker corresponding to a scheduled time.

In addition, although the object position detecting unit 10 according to the present embodiment has been described so as to detect the head of the three-dimensional model of the object estimated by the 3D shape model generating unit 3, the disclosure is not limited thereto. For example, what is to be detected may be simply the centroid of the three-dimensional model of the object or the centroid of a circumscribed rectangular parallelepiped (bounding box). In addition to the foregoing, the object position may be detected by a sensor such as GPS without using the three-dimensional shape of the object, or the object's face or head position may be detected from the captured picture using an image recognition technique.

In addition, although the present embodiment has been described so as to allow a linear movement of the virtual viewpoint in a case where the virtual viewpoint has been generated based on the viewpoint information, there may be specifically provided a constraint such that the virtual viewpoint cannot approach the object closer than a preliminarily determined distance. Accordingly, it is possible to prevent, for example, the virtual viewpoint from moving into or behind the object and shifting the object out of the angle of view.

In addition, when it is desirable to provide the virtual viewpoint with an input emulating camera shake, the present embodiment may be configured to relax the constrain of the sight information to a straight line and allow a slight movement away from the straight line, and thus enable a movement of the virtual viewpoint within that range caused by an input to the virtual viewpoint operating unit 5. Furthermore, emulation of camera shake is not limited to an input from the virtual viewpoint operating unit 5, and vibration (movement) emulating camera shake may be applied in the virtual viewpoint setting unit. For example, the position of the mark indicating the view direction set by the sight designating unit 9, or the position of the virtual viewpoint set by the virtual viewpoint operating unit 5 may be added to the coordinate change amount corresponding to vibration that changes randomly along the time axis.

Figure 5:
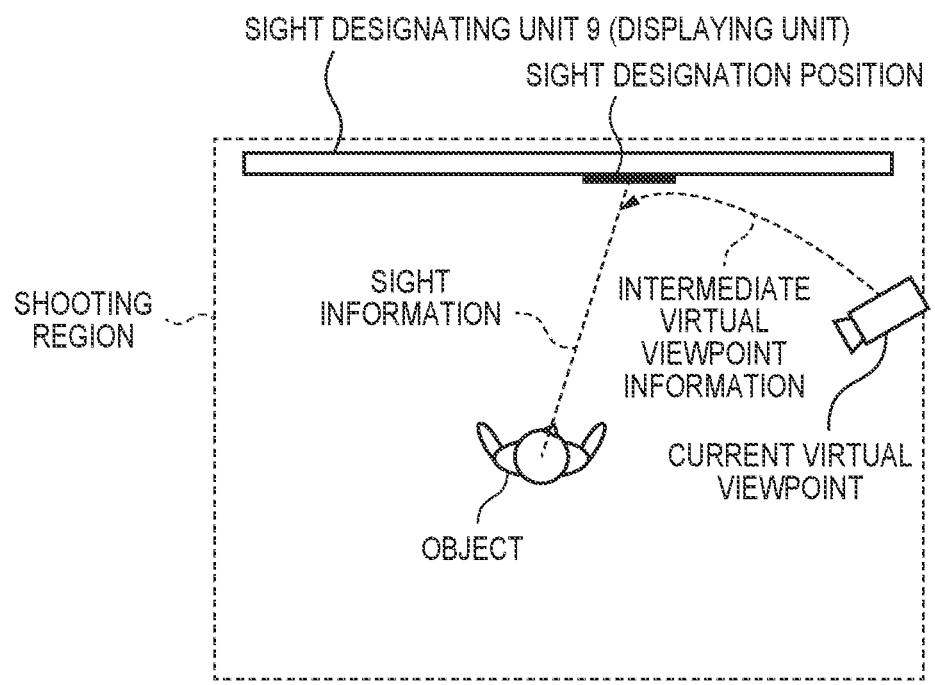
FIG. 5 illustrates a virtual viewpoint connecting a current virtual viewpoint and a virtual viewpoint based on the viewpoint information.

In addition, although the aforementioned embodiment has been described such that, at a time associated with sight information, the virtual viewpoint setting unit 6 automatically moves the virtual viewpoint to the virtual viewpoint position based on the sight information, the disclosure is not necessarily limited thereto. For example, as illustrated in FIG. 5, the virtual viewpoint setting unit 6 may be configured to generate intermediate virtual viewpoint information, which is virtual viewpoint information indicating continuous and smooth movement from the current virtual viewpoint position to a virtual viewpoint position based on the sight information, prior to the time having the viewpoint information storied therein. Besides the foregoing, even at a time having sight information storied therein, there may be a choice by the user's instruction such as not to move to the virtual viewpoint position based on the sight information.

In addition, for a configuration including a plurality of image generating units 7 that simultaneously generate virtual viewpoint images and switching between the plurality of virtual viewpoint images using an image switching device or the like, it is not necessarily required to set all the virtual viewpoints based on the sight information. Specifically, a setting to generate, in accordance with the sight information, only one virtual viewpoint image selected from a plurality of virtual viewpoint images to be generated may be provided, and subsequently an image may be output by switching between virtual viewpoints based on other virtual viewpoint images and sight information by an image switching device.

Figure 6A:
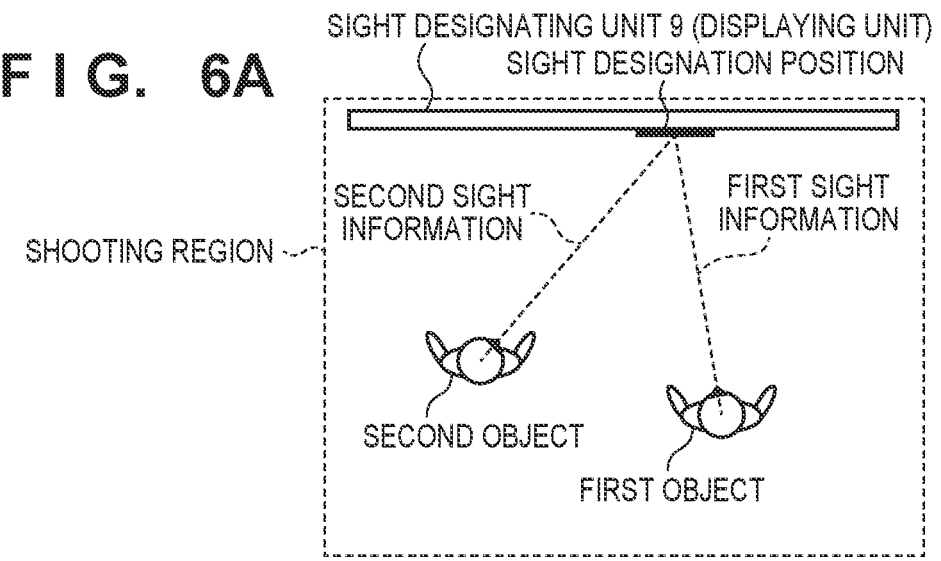
FIGS. 6A to 6C illustrate a relation between sight information and an angle of view at a virtual viewpoint when a plurality of objects are present.
Figure 6B:
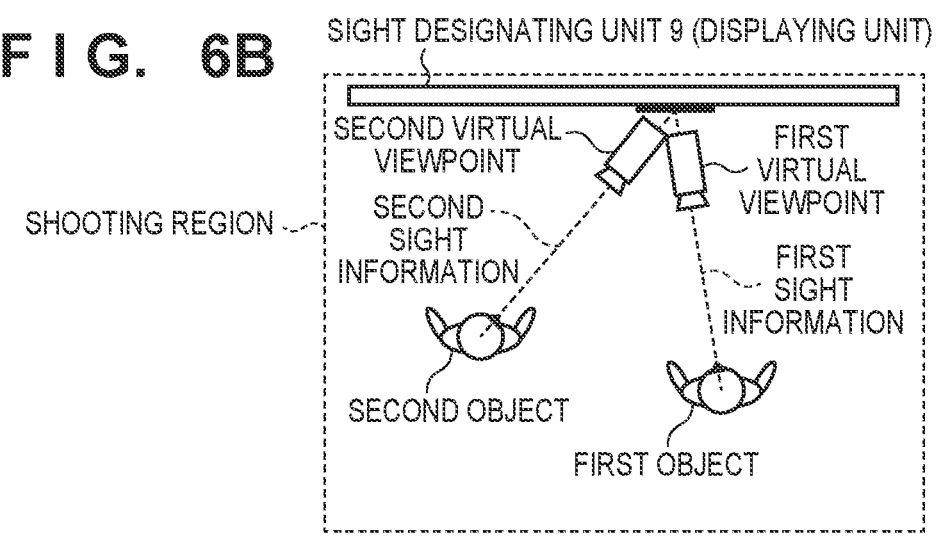
Figure 6C:
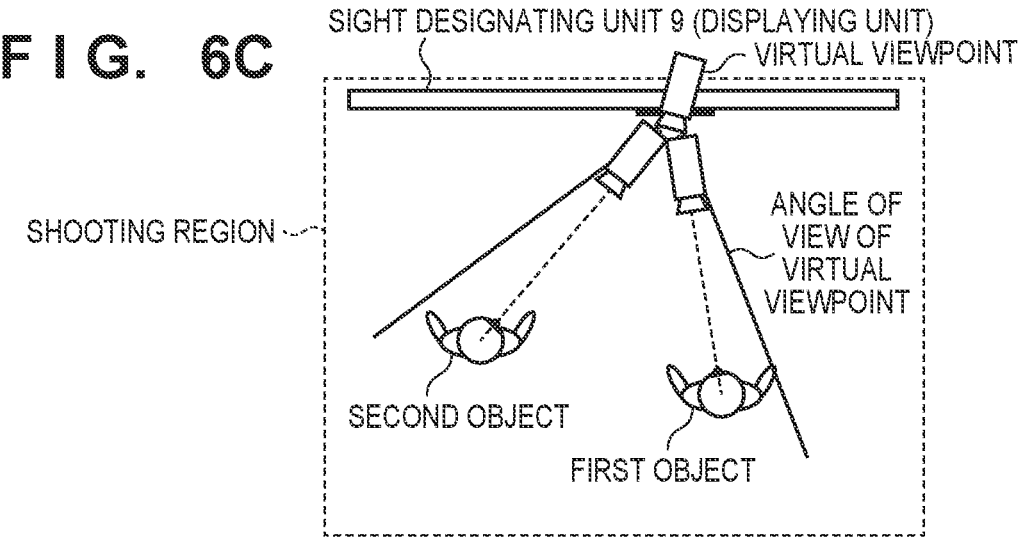

In addition, although a case with a single sight designating unit 9 and a single object has been described in the present embodiment, the disclosure is not necessarily limited thereto. For example, sight information may be generated for a plurality of objects according to a single sight designation, as illustrated in FIG. 6A. In this case, the object position detecting unit 10 detects the position information of each object, and the sight information generating unit 11 generates and stores in the storage unit 4, as pieces of sight information, a plurality of straight lines connecting the sight designation position and the plurality of object positions. Given the foregoing, a plurality of virtual viewpoints may be set to generate a plurality of virtual viewpoint images as illustrated in FIG. 6B in accordance with each piece of sight information during virtual viewpoint image generation. In addition, as illustrated in FIG. 6C, the direction and the angle of view of the virtual viewpoint may be set so as to include a direction based on two pieces of sight information after having set a single virtual viewpoint at a point (sight designation position) w % here a plurality of pieces of sight information intersect. Although FIG. 6C illustrates an example of an angle of view in which two objects are uniformly located, the virtual viewpoint setting unit 6 may be configured. For example, to set a virtual viewpoint such that one of the two objects is located at the center, and subsequently adjust the angle of view so that the other object is enclosed therein.

Figure 7A:
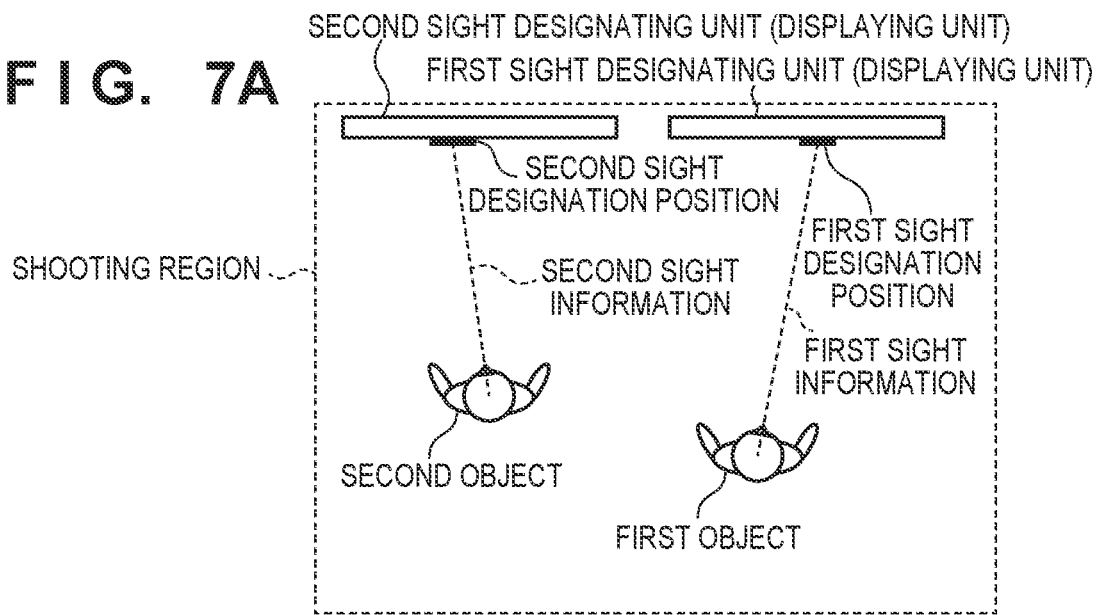
FIGS. 7A to 7C illustrate a plurality of sight designations and a display example of a sight designation.
Figure 7B:
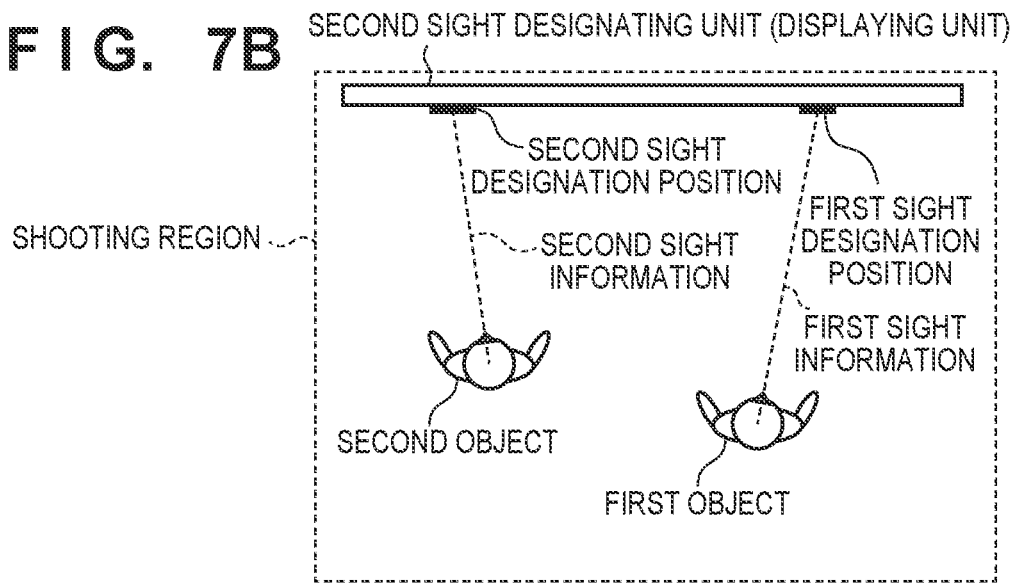
Figure 7C:
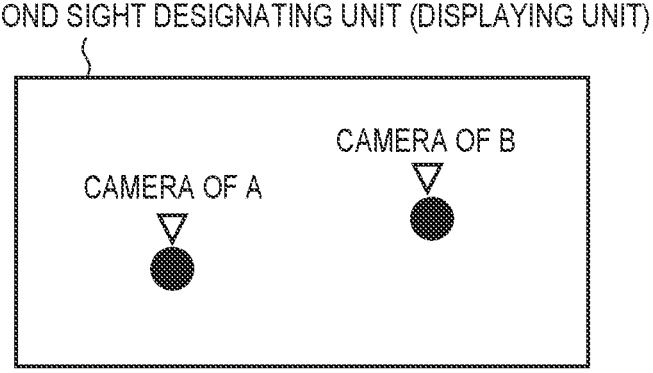

In addition, although there is presented a configuration that uses a single sight designating unit 9 in the present embodiment, the disclosure is not limited thereto. For example, as illustrated in FIG. 7A, a plurality of sight designating units (the first and the second sight designating units in the drawing) may be configured to perform individual sight designations for a plurality of objects. In this case, the sight information generating unit 11 stores a plurality of pieces of sight information in the storage unit 4 at a same time, by generating sight information for each object position corresponding to the position designated by the sight designating unit 9. Accordingly, it becomes possible to simultaneously generate a plurality of images of respective objects looking at the camera when for example delivering a multi-viewpoint image that provides a plurality of virtual viewpoint images at the same time. Although it is assumed here that there are a plurality of the sight designating units 9 for convenience, it is not necessarily required to prepare a plurality of sight designating units 9 in a case where, for example, the sight designating unit 9 is implemented on a display device such as a display. For example, a plurality of sight designations may be indicated by different marks on a single display device, as illustrated in FIGS. 7B and 7C. Additionally, in order to enable the object to identify a mark at which the object directs one's own look, each object may have a sight designated thereto by displaying a piece of information (name in the drawing) on the mark for specifying the object.

[Other Component]

Each of the processing units illustrated in FIG. 1 has been described above suggesting that it is implemented by hardware. However, the configuration except the image capturing unit 1 illustrated in FIG. 1 may be realized, for example, by hardware of an information processing device represented by a personal computer, and an application program executed thereon.

Figure 8:
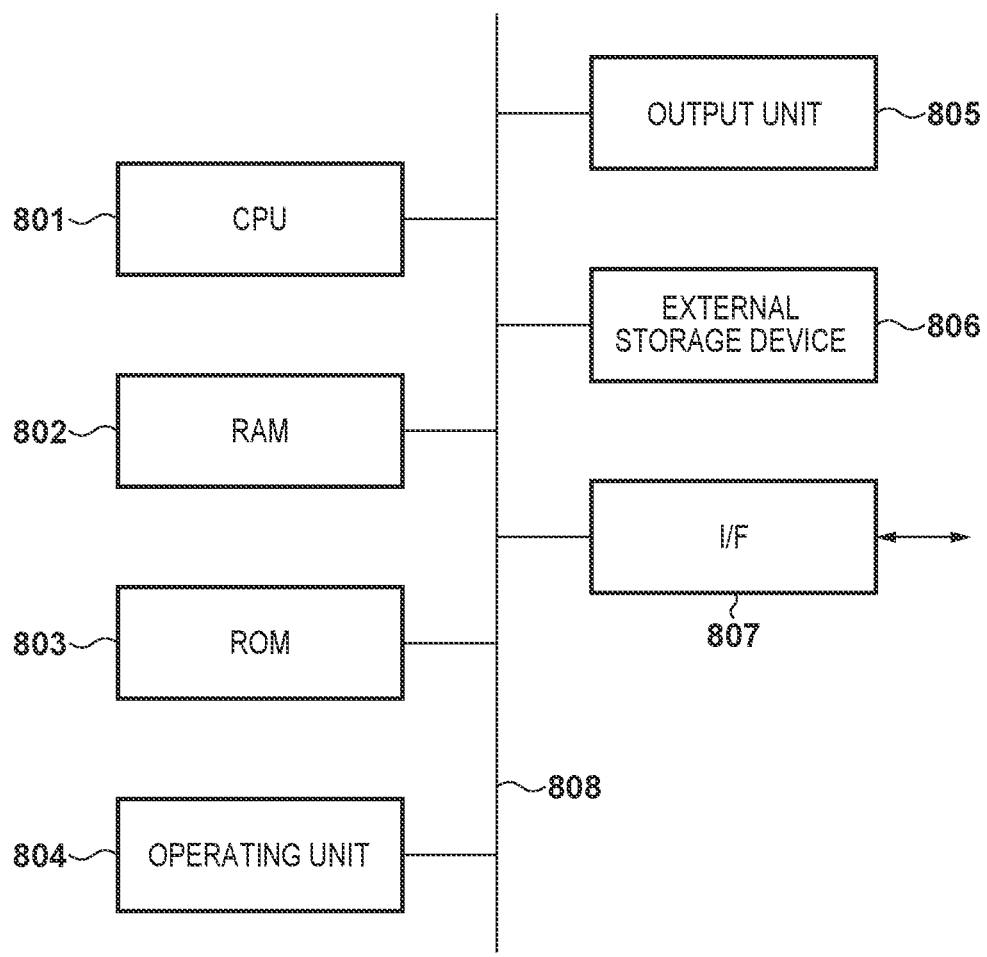
FIG. 8 is a block diagram illustrating a hardware configuration example of an applicable computer.

FIG. 8 is a block diagram illustrating an exemplary hardware configuration of a computer applicable to the embodiments described above.

A CPU 801 controls the entire computer using computer programs and data stored in a RAM 802 or a ROM 803, and also performs the processes which have been described above suggesting that they are performed by an indirect position estimating device according to respective embodiments described above. In other words, the CPU 801 is intended to function as respective processing units except the image capturing unit 1 illustrated in FIG. 1.

The RAM 802 has an area for temporarily storing computer programs or data loaded from an external storage device 806, and data or the like obtained via an interface (I/F) 807. For example, the RAM 802 has a work area used when the CPU 801 performs various processes. In other words, the RAM 802 can be allocated as a frame memory, or can provide other types of areas as appropriate, for example.

The ROM 803 has stored therein setting data, boot-program, or the like of the computer. An operating unit 804, including a keyboard, a mouse, or the like, allows various instructions to be input to the CPU 801 via user operation. An output unit 805 displays results of processing by the CPU 801. In addition, the output unit 805 includes a liquid crystal display, for example. For example, the virtual viewpoint operating unit 5 includes the operating unit 804, and the displaying unit 8 includes the output unit 805.

The external storage device 806 is a large-capacity information storage device represented by a hard disk drive. The external storage device 806 has stored therein the OS (operating system), and computer programs that causes the CPU 801 to realize the functions of respective units illustrated in FIG. 1. Furthermore, the external storage device 806 may also store respective image data to be processed. In addition, the external storage device 806 functions as the storage unit 4 in FIG. 1, and furthermore is used for storing schedule data in the view direction along the time axis generated by the sight designating unit 9.

The computer programs and data stored in the external storage device 806 are loaded to the RAM 802 according to the control by the CPU 801, as appropriate, to be processed by the CPU 801. An I/F 807 can be connected to a network such as a LAN or the Internet, a plurality of image capturing devices corresponding to the image capturing units 1 of FIG. 1, and other devices such as the sight designating unit 9, and the computer can obtain or transmit various information via the I/F 807. A reference numeral 808 indicates a bus connecting each of the aforementioned units.

The operation of the aforementioned components, which has been described in the aforementioned embodiments, is controlled mainly by the CPU 801.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-090584, filed May 28, 2021, which is hereby incorporated by reference herein in its entirety.

What is claimed is:

1. An image processing apparatus, comprising:
one or more memories storing instructions; and
one or more processors executing the instructions to:
obtain a plurality of images captured by a plurality of image capturing devices while a symbol representing a position at which an object should direct a look is being displayed;
generate a virtual viewpoint image in accordance with a position of a virtual viewpoint and a view direction from the virtual viewpoint, the position of the virtual viewpoint being a position at which the symbol is displayed, and the view direction from the virtual viewpoint being a direction specified based on the position of the virtual viewpoint and a position of the object;
accept a designation of a position of a virtual viewpoint and a view direction from the virtual viewpoint with user operation; and
in generating a virtual viewpoint image corresponding to a time period in which the symbol is not displayed, generate, in accordance with the plurality of images captures by the plurality of image capturing devices during the time period in which the symbol is not displayed, a virtual viewpoint image in accordance with the position of the virtual viewpoint and the view direction from the virtual viewpoint that are designated.

2. The apparatus according to claim 1, wherein the one or more processors further execute the instructions to generate information for specifying the symbol representing the position at which the object should direct a look.

3. The apparatus according to claim 2, wherein the information is information for specifying the position at which the object should direct a look, the position representing a view direction along a time axis.

4. The apparatus according to claim 2, wherein, in a case where a plurality of the objects are present, the information is information for specifying a position representing a view direction of each of the plurality of the objects.

5. The apparatus according to claim 4, wherein the one or more processors further execute the instructions to display, in accordance with the information, a symbol that can be recognized by each of the plurality of the objects.

6. The apparatus according to claim 1, wherein the one or more processors further execute the instructions to display the symbol representing the position at which the object should direct a look.

7. The apparatus according to claim 1, wherein the view direction from the virtual viewpoint is a direction from the position of the virtual viewpoint toward the position of the object.

8. The apparatus according to claim 1, wherein, in a case where a plurality of the objects are present, the virtual viewpoint image includes the plurality of the objects.

9. A method of controlling an image processing apparatus, the method comprising:
obtaining a plurality of images captured by a plurality of image capturing devices while a symbol representing a position at which an object should direct a look is being displayed;
generating a virtual viewpoint image in accordance with a position of a virtual viewpoint and a view direction from the virtual viewpoint, the position of the virtual viewpoint being a position at which the symbol is displayed, and the view direction from the virtual viewpoint being a direction specified based on the position of the virtual viewpoint and a position of the object;

accepting a designation of a position of a virtual viewpoint and a view direction from the virtual viewpoint with user operation; and in generating a virtual viewpoint image corresponding to a time period in which the symbol is not displayed, generating, in accordance with the plurality of images captures by the plurality of image capturing devices during the time period in which the symbol is not displayed, a virtual viewpoint image in accordance with the position of the virtual viewpoint and the view direction from the virtual viewpoint that are designated.

10. A non-transitory computer-readable storage medium storing a program which, when read and executed by a computer, causes the computer to execute the steps of a method of controlling an image processing apparatus, the method comprising:

obtaining a plurality of images captured by a plurality of image capturing devices while a symbol representing a position at which an object should direct a look is being displayed;

generating a virtual viewpoint image in accordance with a position of a virtual viewpoint and a view direction from the virtual viewpoint, the position of the virtual viewpoint being a position at which the symbol is displayed, and the view direction from the virtual viewpoint being a direction specified based on the position of the virtual viewpoint and a position of the object;

accepting a designation of a position of a virtual viewpoint and a view direction from the virtual viewpoint with user operation; and in generating a virtual viewpoint image corresponding to a time period in which the symbol is not displayed, generating, in accordance with the plurality of images captures by the plurality of image capturing devices during the time period in which the symbol is not displayed, a virtual viewpoint image in accordance with the position of the virtual viewpoint and the view direction from the virtual viewpoint that are designated.

* * * * *